US012123147B2

(12) United States Patent
Edens et al.

(10) Patent No.: US 12,123,147 B2
(45) Date of Patent: Oct. 22, 2024

(54) ROLLED FIBROUS PRODUCT PATTERNS

(71) Applicant: The Procter & Gamble Company, Cincinnati, OH (US)

(72) Inventors: Khrystyan A. Edens, Cincinnati, OH (US); Kari B. Ross, Cincinnati, OH (US); Brittany Stephens, Cincinnati, OH (US); Lynne C. Hannen, West Chester, OH (US); Sarah A. Saville, Covington, KY (US)

(73) Assignee: The Procter & Gamble Company, Cincinnati, OH (US)

(*) Notice: Subject to any disclaimer, the term of this patent is extended or adjusted under 35 U.S.C. 154(b) by 11 days.

(21) Appl. No.: 17/481,620

(22) Filed: Sep. 22, 2021

(65) Prior Publication Data

US 2022/0090327 A1 Mar. 24, 2022

Related U.S. Application Data

(60) Provisional application No. 63/082,100, filed on Sep. 23, 2020.

(51) Int. Cl.
*D21H 27/02* (2006.01)
*B31F 1/07* (2006.01)
*D21H 27/00* (2006.01)

(52) U.S. Cl.
CPC .............. *D21H 27/02* (2013.01); *B31F 1/07* (2013.01); *D21H 27/002* (2013.01); *B31F 2201/0797* (2013.01)

(58) Field of Classification Search
CPC .................. B31F 1/07; B31H 2201/07; B31H 2201/0733; D21H 27/002; D21H 27/02
USPC .......................................................... 162/361
See application file for complete search history.

(56) References Cited

U.S. PATENT DOCUMENTS

| | | | | |
|---|---|---|---|---|
| D765,431 | S | 9/2016 | Aragon | |
| D897,117 | S | 9/2020 | Gordon | |
| D905,972 | S | 12/2020 | Saville et al. | |
| 11,408,129 | B2 | 8/2022 | Polat et al. | |
| 2014/0134374 | A1* | 5/2014 | Chu | B31F 1/07 428/156 |

* cited by examiner

*Primary Examiner* — Jacob T Minskey
*Assistant Examiner* — Matthew M Eslami
(74) *Attorney, Agent, or Firm* — Richard L. Alexander

(57) ABSTRACT

A rolled product may comprise an embossed pattern on a fibrous sheet, the embossed pattern comprising first and second embossed objects and, in certain cases, a logo. The first and second embossed objects may be spaced from each other in certain relationships and, in certain cases, may be spaced from the logo in certain relationships.

29 Claims, 8 Drawing Sheets

ROLLED FIBROUS PRODUCT PATTERNS

CROSS REFERENCE TO RELATED APPLICATION

This application claims the benefit of U.S. Provisional Application No. 63/082,100, filed Sep. 23, 2020, the substance of which is incorporated herein by reference.

FIELD OF THE INVENTION

The present disclosure relates to rolled fibrous product patterns.

BACKGROUND OF THE INVENTION

Patterns, such as emboss patterns, play an important role in rolled products, rolled absorbent products, and rolled fibrous products such as, for example, paper towels, facial tissue, and toilet tissue. Patterns may connote and/or contribute to strength and/or softness of the rolled product, and/or may connote absorbent capacity and other such common intensive properties of the rolled product.

Logos, including trademarks, may be desirably used to identify the maker of a rolled product, and/or to remind the user of the source of the rolled product, and/or to advertise the brand of the rolled product each time that it is being enjoyed by the user.

It is, however, often difficult to insert a logo into a pattern, especially a pattern comprising closed shapes. Often, the pattern needs to be adjusted around the logo because the logo needs to be big enough to be readily identifiable, but, then, due to its size, the logo will not fit within the pattern. However, interrupting the pattern can cause issues with the finished rolled product, such as puckering of the fibrous web making up the rolled product. Another problem is that an interrupted pattern can look like a defect in the rolled product.

Thus, there is a need to interrupt patterns for inserting a logo in a way that looks intentional (versus accidental) and that maintains the integrity of the rolled product.

Beyond the challenges of inserting a logo into an embossed pattern, embossing the fibrous web such that two or more embossed objects, their ends or edges spaced from each other in the cross-machine direction, terminate at a same machine direction axis can also result in a wrinkle or a pucker of the web. Thus, there is a need to dispose embossed objects into embossed patterns such that this dynamic is avoided.

SUMMARY OF THE INVENTION

In a first aspect of the disclosure, a rolled product comprises an embossed pattern on a fibrous web, the embossed pattern comprising first and second embossed objects and a logo. The first embossed object has a first end or a first edge that is within a first CD distance of 20 mm of the logo. The second embossed object has a second end or a second edge that is within a second CD distance of 20 mm of the logo. The second CD distance is not equal to the first CD distance. The second end or second edge of the second embossed object is at an angle of greater than about 10 degrees relative to the first end or first edge of the first embossed object.

The first CD distance may be from about 2.5 mm to about 20 mm.

The second CD distance may be from about 2.5 mm to about 20 mm.

The angle may be from about 10 to about 50.

The first embossed object may comprise a linear segment.

The first embossed object may comprise two linear segments.

The first end may be at an end of a linear segment.

The second embossed object may comprise dots or dashes.

The second embossed object may comprise a line of dots.

The second edge may be at an edge of an end dot in a line of dots; and/or the line of dots may be spaced from and runs parallel with a linear segment.

The logo may be a collection of embossed letters.

The rolled product may further comprise perforations that separate the fibrous web into a plurality of connected sheets; and/or at least one of the perforations may overlap the first embossed object; and/or at least one of the perforations may overlap the second embossed object.

The second embossed object may be a line of dots running parallel to the first embossed object that may be a linear segment, wherein the line of dots may be outboard of the linear segment such that the linear segment is between the line of dots and the logo.

The embossed pattern may comprise a plurality of closed forms; and/or the plurality of closed forms may be selected from a group consisting of diamonds, rectangles, squares, circles, pentagons, hexagons, octagons, and combinations thereof.

The plurality of rolled product may be selected from paper towels and toilet paper.

The rolled product may comprise a plurality of sheets separated by perforations, and more than 50% of the plurality of sheets may comprise logos identical to the logo.

The fibrous web may further comprise a molded pattern; and/or the molded pattern may comprise linear segments, dots, and/or dashes that are smaller (in scale) than linear segments, dots, and/or dashes of the embossed pattern; and/or the molded pattern may comprise linear segments that are smaller (in scale) than linear segments of the embossed pattern.

A spatial relationship may be formed between the first and second embossed objects and the logo, and the spatial relationship may be formed between third and fourth embossed objects and a second logo, wherein the first and second embossed objects may be identical to the third and fourth embossed objects, respectively, and wherein the logo and the second logo may be identical.

The first end or the first edge may be within a first CD distance of 3 mm of the logo.

The second end or the second edge of the second embossed object may be within a second CD distance of 7 mm of the logo.

The second end or second edge of the second embossed object may be at an angle of greater than about 10 degrees relative to the first end or first edge of the first embossed object.

The second CD distance may be from about 5 mm to about 20 mm.

The angle may be from about 15 to about 50.

In another aspect of the disclosure, a rolled product comprises an embossed pattern comprising a closed shape. The embossed pattern further comprises a first open shape disposed adjacent to and above (in a cross-machine direction, CD) a logo and a second open shape disposed adjacent to and below (in the CD) the logo; where no ends of the first or second open shapes are within about 2.5 mm to the logo in along a CD axis.

The first and second open shapes may be capable of a matching overlap with a portion the closed shape.

The first open shape may comprise a linear segment and wherein a line of dots and/or dashes may be spaced from and runs parallel with the linear segment.

The at least 3 open shapes may be immediately adjacent to the logo.

The first open shape may be formed from first and second linear segments, wherein the first linear segment may have a linear length greater than the second linear segment; and/or the second open shape may be formed from third and fourth linear segments, wherein the third linear segment may have a linear length greater than the fourth linear segment; and/or wherein the first and third linear segments may have the same length and/or the second and fourth linear segments have the same length; and/or wherein a first angle may be formed between the first and second linear segments and wherein a second angle may be formed between the third and fourth linear segments, and wherein the first and second angles may be within 5 degrees of each other; and/or wherein the closed shape comprises a third angle, and wherein the third angle may be the same as the first and second angles; and/or wherein a first angle may be formed between the first and second linear segments and wherein the closed shape may comprise a third angle, and wherein the third angle may be the same as the first angle; and/or wherein a second angle may be formed between the third and fourth linear segments and wherein the closed shape may comprise a third angle, and wherein the third angle may be the same as the second angle.

A spatial relationship may be formed between the first and second open shapes and the logo, and wherein the spatial relationship may be formed between third and fourth open shapes and a second logo, wherein the first and second open shapes may be identical to the third and fourth open shapes, respectively, and wherein the logo and the second logo may be identical.

In another aspect of the disclosure, a rolled product, comprising an embossed pattern comprising a closed shape. The embossed pattern further comprises a first shape disposed adjacent to and above (in a cross-machine direction, CD) a logo and a second shape disposed adjacent to and below (in the CD) the logo, wherein no ends or edges of the first or second shapes are within about 2.5 mm to the logo in along a CD axis.

The first shape may be formed by a plurality of solid shapes.

The second shape may be formed by a plurality of solid shapes.

In another aspect of the disclosure, a rolled product, comprising: an embossed pattern on a fibrous web, wherein the fibrous web comprises a machine direction axis (MDA). The embossed pattern comprises first and second embossed objects. The first embossed object has a first end or a first edge that terminates at the MDA. The second embossed object does not have an end or an edge that terminates at the MDA. The first and second embossed objects are spaced from each other in a cross-machine direction.

DETAILED DESCRIPTION OF THE INVENTION

Figure 1:
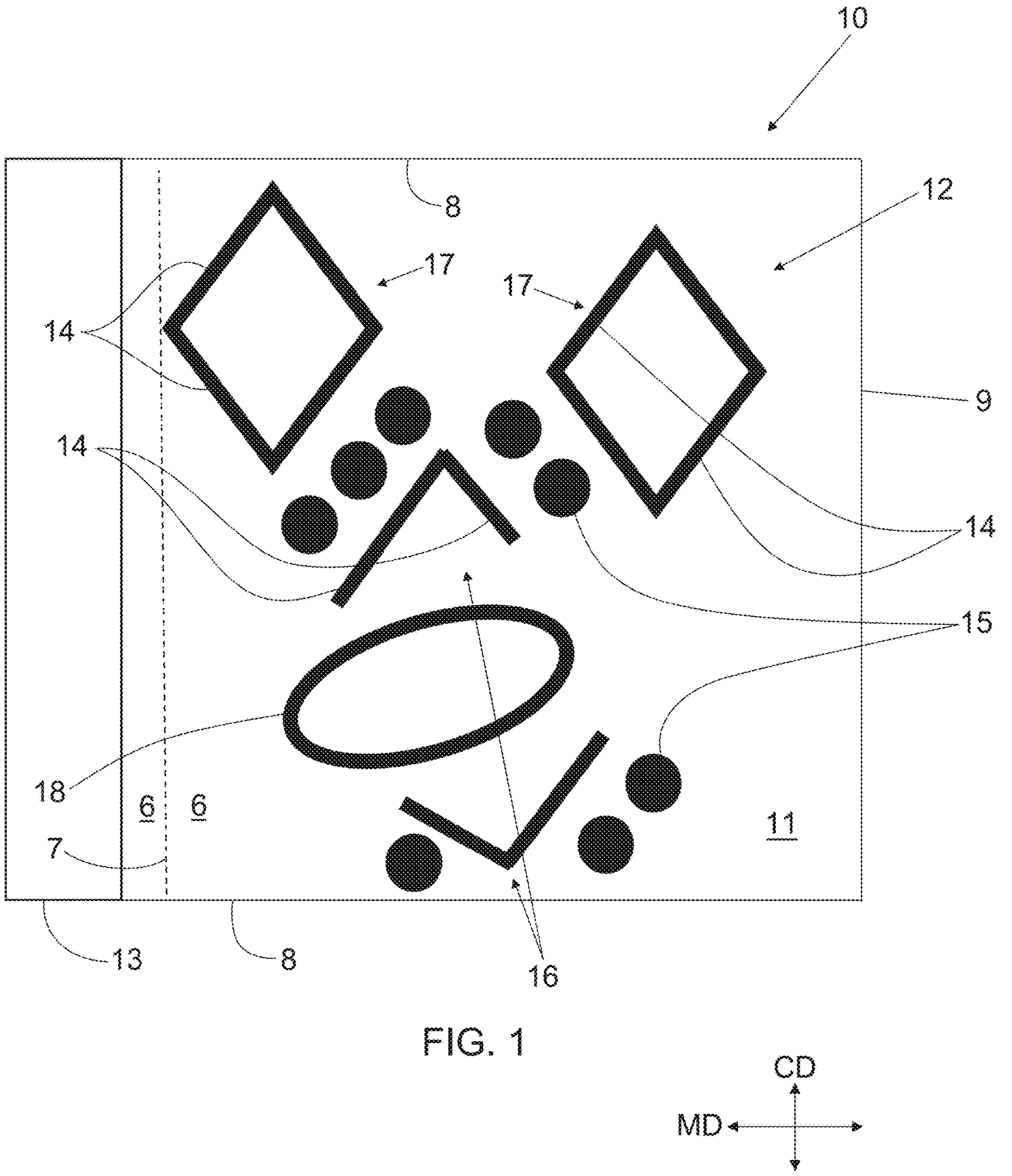
FIG. 1 is a plan view of an embossed pattern of the present disclosure disposed on a fibrous structure of a rolled product.

The following term explanations may be useful in understanding the present disclosure:

“Fibrous structure or fibrous web” as used herein means a structure (web) that comprises one or more fibers. Non-limiting examples of processes for making fibrous structures include known wet-laid fibrous structure making processes, air-laid fibrous structure making processes, meltblowing fibrous structure making processes, co-forming fibrous structure making processes, and spunbond fibrous structure making processes. Such processes typically include steps of preparing a fiber composition, oftentimes referred to as a fiber slurry in wet-laid processes, either wet or dry, and then depositing a plurality of fibers onto a forming wire or belt such that an embryonic fibrous structure is formed, drying and/or bonding the fibers together such that a fibrous structure is formed, and/or further processing the fibrous structure such that a finished fibrous structure is formed. The fibrous structure may be a through-air-dried fibrous structure and/or conventionally dried fibrous structure. The fibrous structure may be creped or uncreped. The fibrous structure may exhibit differential density regions or may be substantially uniform in density. The fibrous structure may be pattern densified, conventionally felt-presses and/or high-bulk, uncompacted. The fibrous structures may be homogenous or multilayered in construction.

After and/or concurrently with the forming of the fibrous structure, the fibrous structure may be subjected to physical transformation operations such as embossing, calendering, selfing, printing, folding, softening, ring-rolling, applying additives, such as latex, lotion and softening agents, combining with one or more other plies of fibrous structures, and the like to produce a finished fibrous structure that forms and/or is incorporated into a sanitary tissue product.

Fibrous webs of the present disclosure may be wound onto a durable transfer roll core and may be used to form sanitary tissue products described below and may have the plies, basis weight values, tensile strength values, softness values, absorbency values, lint values, and textures described below.

“Sanitary tissue product” as used herein means a wiping implement for post-urinary and/or post-bowel movement cleaning (referred to as “toilet paper,” “toilet tissue,” or “toilet tissue product”), for otorhinolaryngological discharges (referred to as “facial tissue” or “facial tissue product”) and/or multi-functional absorbent and cleaning uses (referred to as “paper towels,” “paper towel products,” “absorbent towels,” “absorbent towel products,” such as paper towel or “wipe products”).

The sanitary tissue products of the present disclosure may comprise one or more fibrous structures and/or finished fibrous structures.

The sanitary tissue products of the present disclosure may exhibit a basis weight between about 10 $g/m^2$ to about 120 $g/m^2$ and/or from about 15 $g/m^2$ to about 110 $g/m^2$ and/or from about 20 $g/m^2$ to about 100 $g/m^2$ and/or from about 30 to 90 $g/m^2$. In addition, the sanitary tissue product of the present disclosure may exhibit a basis weight between about 40 $g/m^2$ to about 120 $g/m^2$ and/or from about 50 $g/m^2$ to about 110 $g/m^2$ and/or from about 55 $g/m^2$ to about 105 $g/m^2$ and/or from about 60 to 100 $g/m^2$.

The sanitary tissue products of the present disclosure may exhibit a total dry tensile strength of greater than about 59 g/cm (150 g/in) and/or from about 78 g/cm (200 g/in) to about 394 g/cm (1000 g/in) and/or from about 98 g/cm (250 g/in) to about 335 g/cm (850 g/in). In addition, the sanitary tissue product of the present disclosure may exhibit a total dry tensile strength of greater than about 196 g/cm (500 g/in) and/or from about 196 g/cm (500 g/in) to about 394 g/cm (1000 g/in) and/or from about 216 g/cm (550 g/in) to about 335 g/cm (850 g/in) and/or from about 236 g/cm (600 g/in) to about 315 g/cm (800 g/in). In one example, the sanitary tissue product exhibits a total dry tensile strength of less than about 394 g/cm (1000 g/in) and/or less than about 335 g/cm (850 g/in). Two or more sanitary tissue products within an array of sanitary tissue products according to the present disclosure may exhibit different total dry tensile strengths.

In one example, one sanitary tissue product in an array of sanitary tissue products according to the present disclosure exhibits a total dry tensile strength of greater than 216 g/cm (550 g/in) and another sanitary tissue product within the array exhibits a total dry tensile strength of less than 216 g/cm (550 g/in).

In another example, the sanitary tissue products of the present disclosure may exhibit a total dry tensile strength of greater than about 315 g/cm (800 g/in) and/or greater than about 354 g/cm (900 g/in) and/or greater than about 394 g/cm (1000 g/in) and/or from about 315 g/cm (800 g/in) to about 1968 g/cm (5000 g/in) and/or from about 354 g/cm (900 g/in) to about 1181 g/cm (3000 g/in) and/or from about 354 g/cm (900 g/in) to about 984 g/cm (2500 g/in) and/or from about 394 g/cm (1000 g/in) to about 787 g/cm (2000 g/in).

The sanitary tissue products of the present disclosure may exhibit a total wet tensile strength of less than about 78 g/cm (200 g/M) and/or less than about 59 g/cm (150 g/in) and/or less than about 39 g/cm (100 g/in) and/or less than about 29 g/cm (75 g/in).

The sanitary tissue products of the present disclosure may exhibit a density of less than about 0.60 $g/cm^3$ and/or less than about 0.30 $g/cm^3$ and/or less than about 0.20 $g/cm^3$ and/or less than about 0.10 $g/cm^3$ and/or less than about 0.07 $g/cm^3$ and/or less than about 0.05 $g/cm^3$ and/or from about 0.01 $g/cm^3$ to about 0.20 $g/cm^3$ and/or from about 0.02 $g/cm^3$ to about 0.10 $g/cm^3$.

The sanitary tissue products of the present disclosure may be in any suitable form, such as in a roll, in individual sheets, in connected, but perforated sheets, in a folded format or even in an unfolded.

The sanitary tissue products of the present disclosure may comprises additives such as softening agents, temporary wet strength agents, permanent wet strength agents, bulk softening agents, lotions, silicones, and other types of additives suitable for inclusion in and/or on sanitary tissue products. In one example, the sanitary tissue product, for example a toilet tissue product, comprises a temporary wet strength resin. In another example, the sanitary tissue product, for example an absorbent towel product, comprises a permanent wet strength resin.

"Ply" or "plies" as used herein means an individual finished fibrous structure optionally to be disposed in a substantially contiguous, face-to-face relationship with other plies, forming a multiple ply ("multi-ply") sanitary tissue product. It is also contemplated that a single-ply sanitary tissue product can effectively form two "plies" or multiple "plies", for example, by being folded on itself.

"Basis Weight" as used herein is the weight per unit area of a sample reported in lbs/3000 $ft^2$ or $g/m^2$. The basis weight is measured herein by the basis weight test method described in the Test Methods section herein.

"Dry Tensile Strength" (or simply "Tensile Strength" as used herein) of a fibrous structure of the present disclosure and/or a sanitary tissue product comprising such fibrous structure is measured according to the Tensile Strength Test Method described herein.

"Softness" as used herein means the softness of a fibrous structure according to the present disclosure and/or a sanitary tissue product comprising such fibrous structure, which is determined according to a human panel evaluation wherein the softness of a test product is measured versus the softness of a control or standard product. The resulting number is a relative measure of softness between the two fibrous structures and/or sanitary tissue products. The softness is measured herein by the softness test method described in the Test Methods section herein.

"Absorbency" as used herein means the characteristic of a fibrous structure according to the present disclosure and/or a sanitary tissue product comprising such fibrous structure, which allows it to take up and retain fluids, particularly water and aqueous solutions and suspensions. In evaluating the absorbency of paper, not only is the absolute quantity of fluid a given amount of paper will hold significant, but the rate at which the paper will absorb the fluid is also. Absorbency is measured herein by the Horizontal Full Sheet (HFS) test method described in the Test Methods section herein.

"Lint" as used herein means any material that originated from a fibrous structure according to the present disclosure and/or sanitary tissue product comprising such fibrous structure that remains on a surface after which the fibrous structure and/or sanitary tissue product has come into contact. The lint value of a fibrous structure and/or sanitary tissue product comprising such fibrous structure is determined according to the Lint Test Method described herein.

"Texture" as used herein means any pattern present in the fibrous structure. For example, a pattern may be imparted to the fibrous structure during the fibrous structure-making process, such as during a through-air-drying step. A pattern may also be imparted to the fibrous structure by embossing the finished fibrous structure during the converting process and/or by any other suitable process known in the art.

"Rolled product(s)" as used herein include fibrous structures, paper, and sanitary tissue products that are in the form of a web and can be wound about a core. For example, rolled sanitary tissue products can be convolutedly wound upon itself about a core or without a core to form a sanitary tissue product roll and can be perforated into the form of discrete sheets, as is commonly known for toilet tissue and paper towels.

Figure 1A:
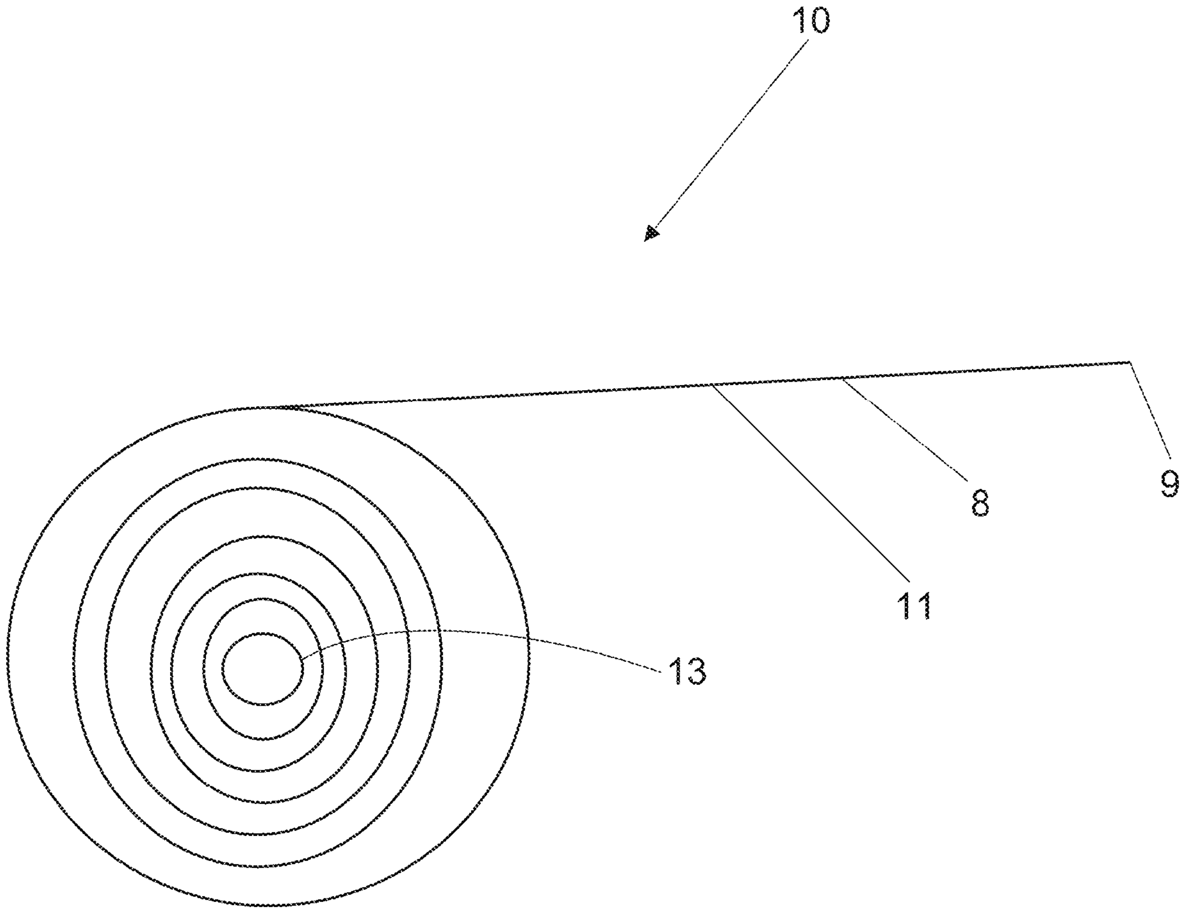
FIG. 1A is a side view of the rolled product of FIG. 1. The embossed pattern of FIG. 1 may be present on a consumer-facing side and/or a roll-facing side of the fibrous structure.

Referring to FIGS. 1 and 1A, a rolled product 10 may comprise a fibrous web 11 wound to form the rolled product 10, such as a roll of paper towels, facial tissue, and toilet paper—these products may or may not comprise a core 13 that the fibrous web 11 may be wound about. The fibrous web 11 of the rolled product 10 may have a free end 9 and side edges 8, which are typically 90 degrees from the free end 9. Further, the fibrous web 11 of the rolled product 10 may comprise perforations 7 (see FIGS. 1 and 2) to form sheets 6. Each, or most, or a majority (more than 50%), of the sheets 6 may comprise a logo 18. The fibrous web 11 may comprise a molded pattern formed by a belt of the paper making process (such as via wet transfer, fabric creping, rush transfer, etc.) and may also comprise an embossed pattern 12—see U.S. Provisional Patent Application Ser. No. 63/036,767 filed on Jun. 9, 2020 for exemplary emboss patterns that may be combined with exemplary molded belt patterns.

While the embossed patterns 12 of the present disclosure may be applied to fibrous webs 11 that are used to form rolled products 10, the embossed patterns 12 of the present disclosure may be applied to facial tissue or baby wipes, for instance, which may be dispensed as individual sheets (for example, interleaved sheets).

Figure 2:
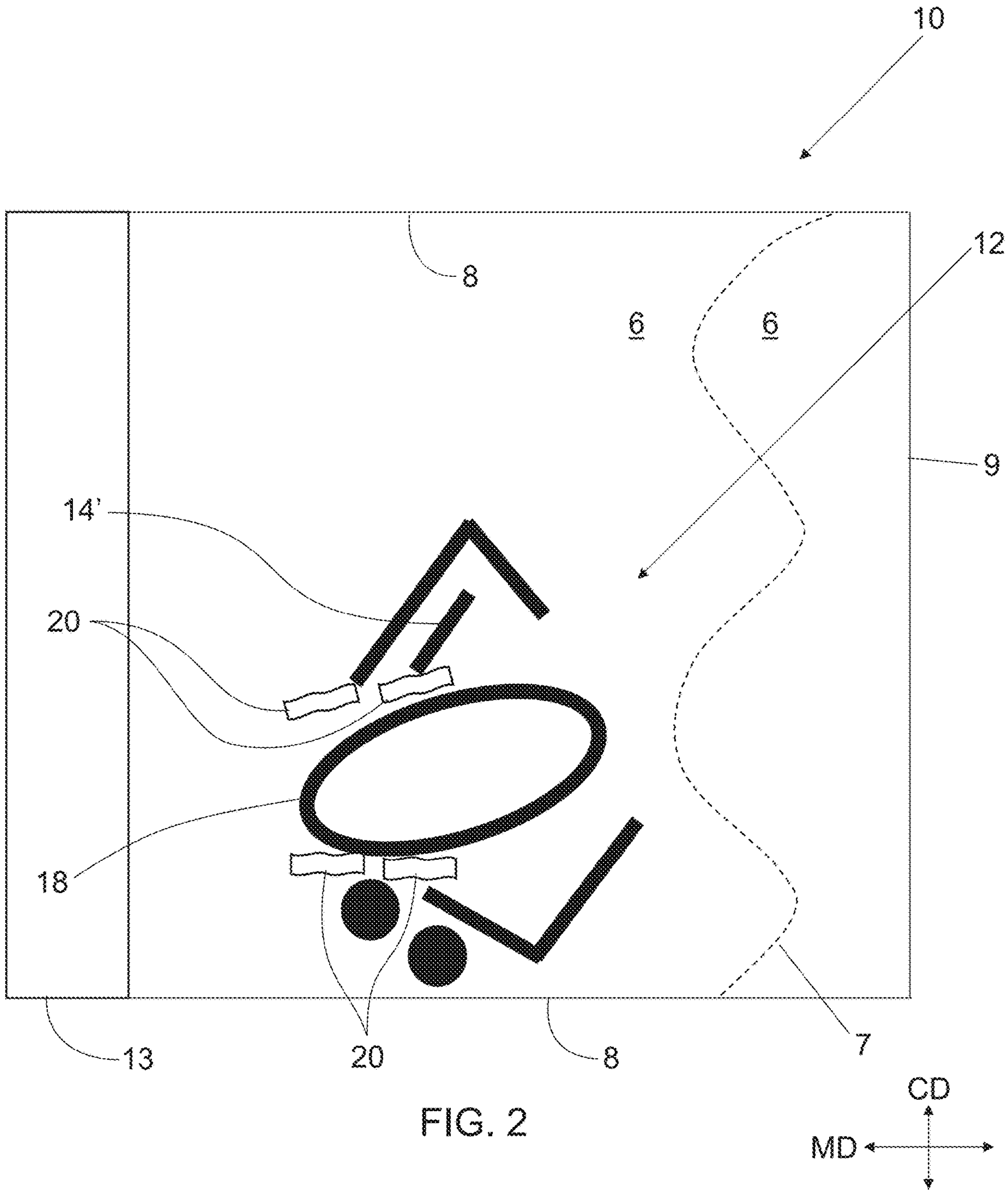
FIG. 2 is a plan view of an embossed pattern disposed on a fibrous structure of a rolled product.

Still referring to FIG. 1, the embossed patterns 12 of the present disclosure may comprise one or more embossed objects, including, but not limited to, linear segments 14, solid shapes 15, open shapes 16, and/or closed shapes 17. The embossed pattern 12 may also comprise a logo 18 that may be used to identify the source of the fibrous web 11, such as a brand name or trademark. As mentioned above, the logo 18 may cause challenges to the other embossed shapes used to form the pattern, as the logo 18 may interrupt the embossed pattern 12 and may cause a dynamic that causes the fibrous web to wrinkle or buckle 20 as shown in FIG. 2.

Figure 5:
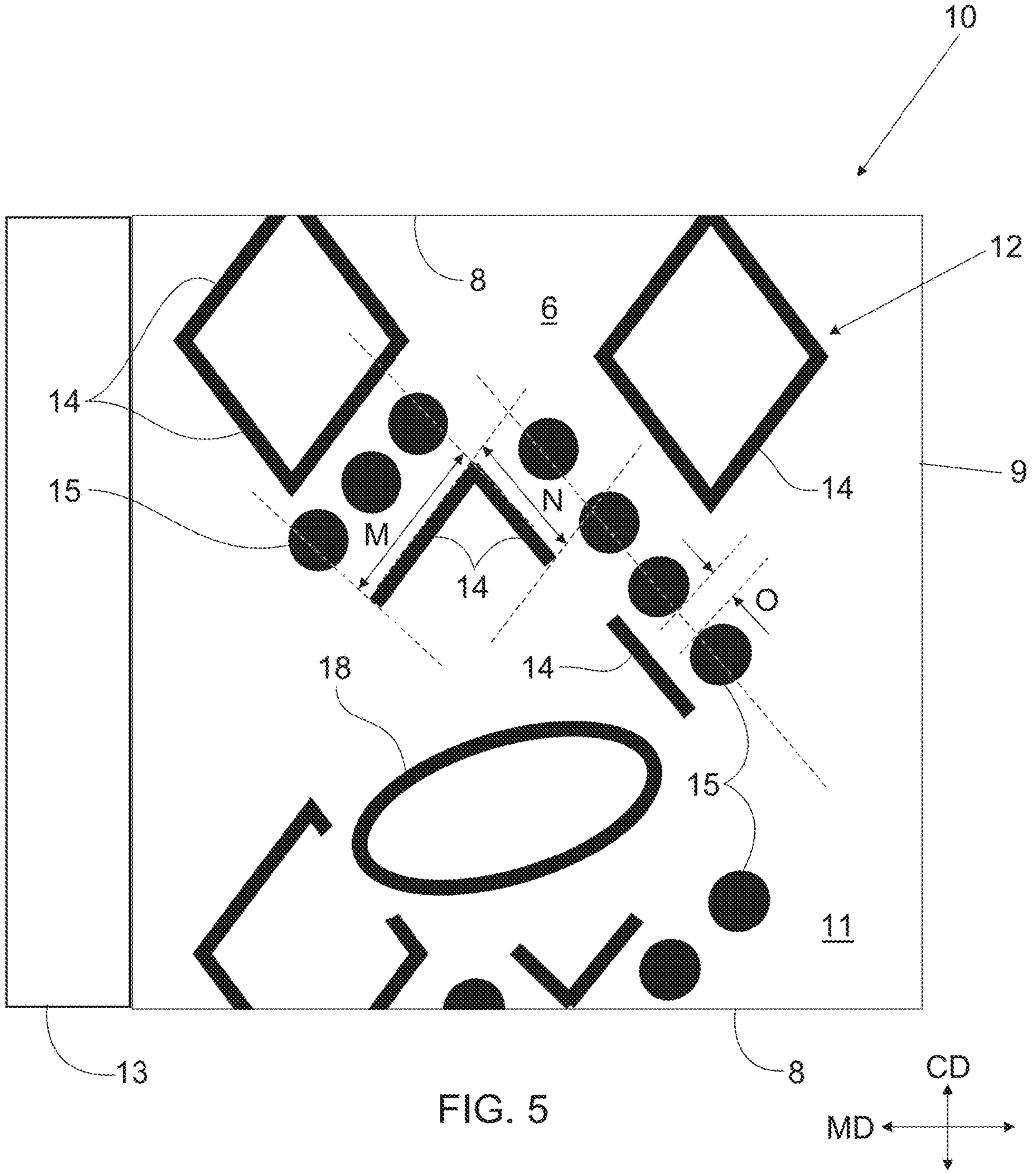
FIG. 5 is a plan view of an embossed pattern of the present disclosure disposed on a fibrous structure of a rolled product.

The linear segment 14 may form individual (i.e., stand-alone) segments 14' (see FIG. 2) of the embossed pattern 12 or may form the open shapes 16 and/or the closed shapes 17 of the embossed pattern 12. Linear segments 14 may have a linear length of from about 2 mm to about 400 mm, or from about 2 mm to about 100 mm, or about 10 mm to about 35 mm (specifically reciting all 0.5 mm increments within the above-recited ranges and all ranges formed therein or thereby, such as 2.5, 3, 3.5, 4, etc. through 400 mm)—see, for example, lengths M and N in FIG. 5. A discrete element with a length to width ratio of greater than 1 is considered a "dash." A plurality of dashes may be incorporated into an embossed pattern 12. Further, a plurality of dashes may run in parallel with and along a linear segment 14, just like in FIG. 5 where three of the embossed dots 15 run parallel to linear segment 14 having a length M—in this illustration in FIG. 5, these 3 dots can be said to be outboard, relative to the logo, of the referenced linear segment having a length M because the linear segment is between the logo 18 and the dots 15.

Closed shapes 17 of the present disclosure may form any closed shape, such as a diamond, square, rectangle, triangle, a polyhedron, etc. such that some inner portion of the closed shape is not embossed. The solid shapes 15, such as dots, dashes, squares, etc., are fully embossed, such that no substantial inner portion of the solid shape is left un-embossed.

Figure 3:
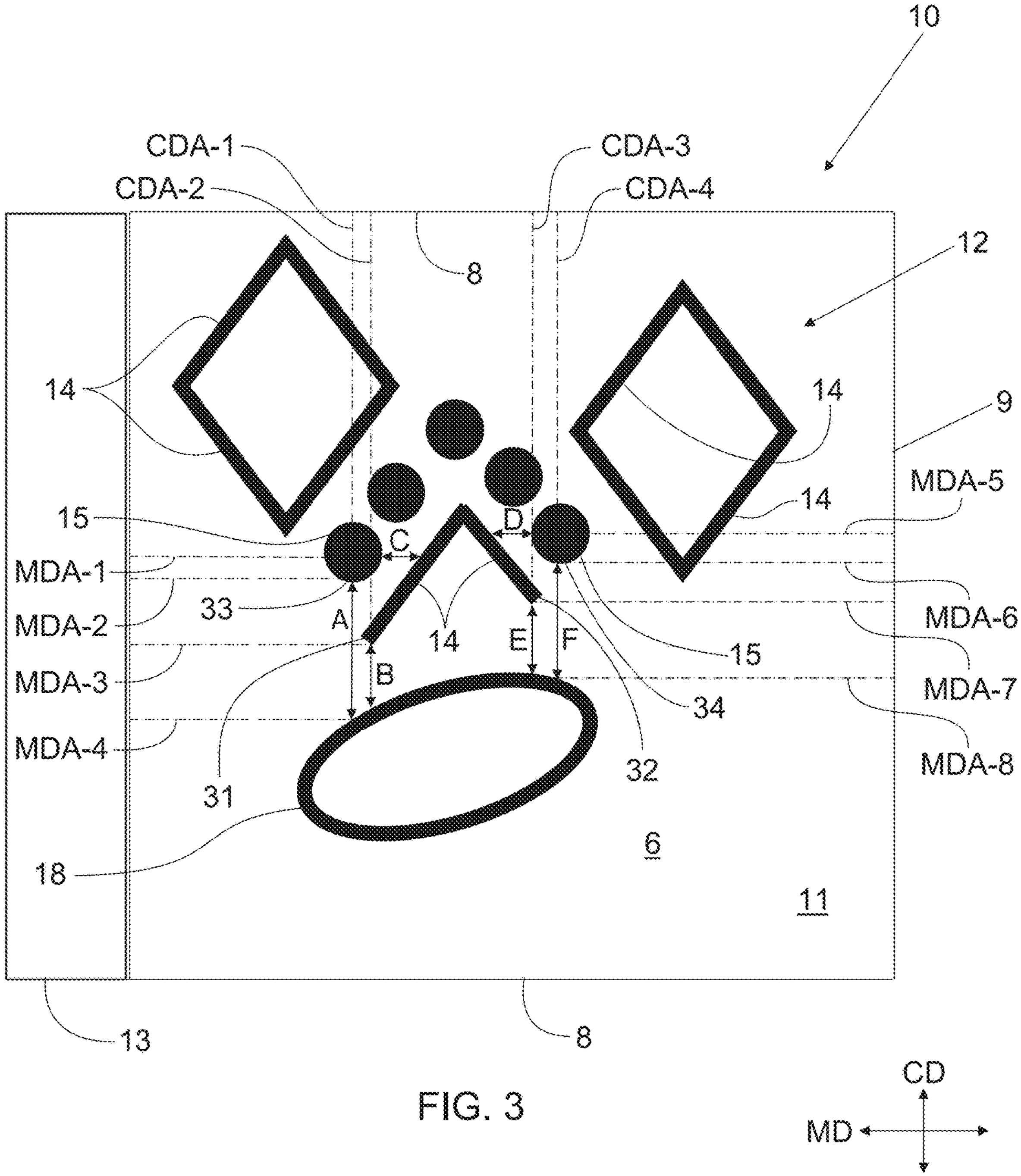
FIG. 3 is a plan view of an embossed pattern of the present disclosure disposed on a fibrous structure of a rolled product.
Figure 4:
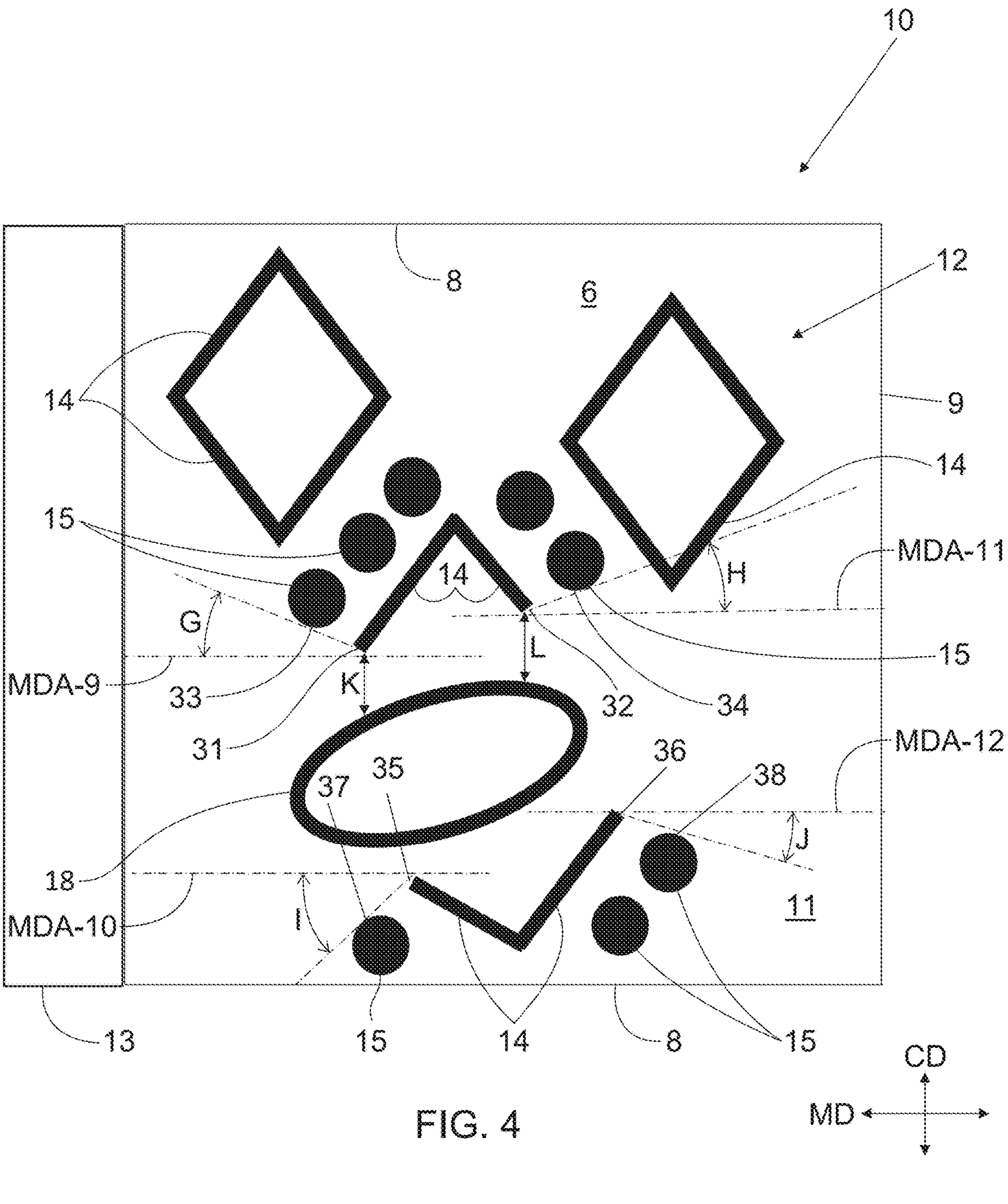
FIG. 4 is a plan view of an embossed pattern of the present disclosure disposed on a fibrous structure of a rolled product.

In order to keep the fibrous sheet 11 from wrinkling and/or buckling, it may be necessary to keep the linear segments 14, closed shapes 17, open shapes 16, and/or solid shapes 15 a certain distance from the logo 18. As shown in FIG. 3, the linear segments 14 making up the open shape 16 has two ends 31 and 32 adjacent to the logo 18, CD distances B and E, which are parallel with the side edges 8 and perpendicular to the end edge 9, and which run along CD axis (such as CDA-2 and CDA-3), respectively—several CD and MD axis are called out and assigned a number. The closest CD distance of any of the ends or edges of any of the embossed objects may desirably be at least about 2.5 mm, at least about 10 mm, or at least about 20 mm (specifically reciting all 0.5 mm increments within the above-recited ranges and all ranges formed therein or thereby, such as 3, 3.5, 4, etc. through 20 mm) from the logo 18. Further, the next closest ends or edges, such as 33 and 34 of solid shapes 15 that are outboard (relative to the logo) of the closest embossed object, may desirably be an CD distance of at least about 2.5 mm, at least about 10 mm, or at least about 20 mm (specifically reciting all 0.5 mm increments within the above-recited ranges and all ranges formed therein or thereby, such as 3, 3.5, 4, etc. through 20 mm) from the logo 18—CD distances A and F, which run along CDA-2 and CDA 4, respectively. If distance A was is the same a distances B and/or if distance F is the same as distance E, wrinkles and/or buckles may occur in the fibrous sheet 11. Wrinkles and/or buckles may also occur if two embossed objects terminate at the same MDA. Further, referring to FIG. 4, it may be desirable that an end 31 of linear segment 14 to edge 33 of solid shape 15 may be an angle of at least about 10 degrees, at least about 25 degrees, or at least about 50 degrees (specifically reciting all 0.5 degree increments within the above-recited ranges and all ranges formed therein or thereby, such as 10.5, 11, 11.5, 12, etc. through 50 degrees) relative to a MD axis (such as MDA-9), see Angle G, angling away from the logo 18; the same may be true for an end 32 of linear segment 14 to edge 34 of solid shape 15 relative to a MD axis (MDA-11), see Angle H, angling away from logo 18; the same may also be true for an end 35 of linear segment 14 to edge 37 of solid shape 15 relative to a MD axis (MDA-10), see Angle I, angling away from logo 18; and the same may be true for an end 36 of linear segment 14 to edge 38 of solid shape 15 relative to an MD axis (MDA-12), see Angle J, angling away from logo 18.

Still further, referring back to FIG. 3, the shapes adjacent to the linear segments 14, which are adjacent to the logo 18, may desirably be spaced along the CD from the linear segments (MD distances C, along Machine Directional Axis-1, MDA-1, and D, along MDA-5) at least about 5 mm, at least about 10 mm, or at least about 20 mm (specifically reciting all 0.5 mm increments within the above-recited ranges and all ranges formed therein or thereby, such as 5.5, 6, 6.5, 7, etc. through 20 mm) to avoid potential wrinkles and/or buckles.

Figure 6:
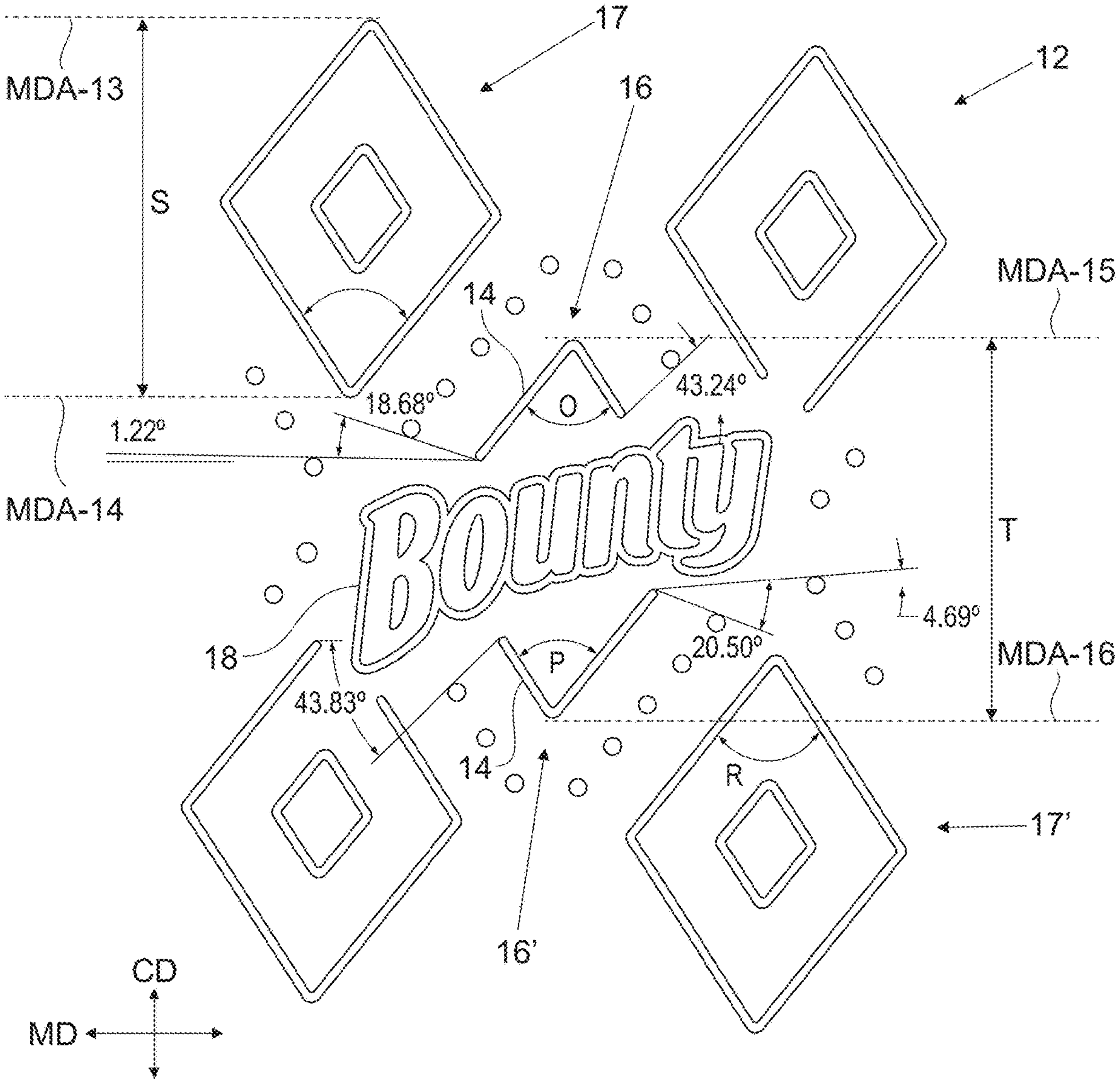
FIG. 6 is a plan view of an embossed pattern of the present disclosure.
Figure 7:
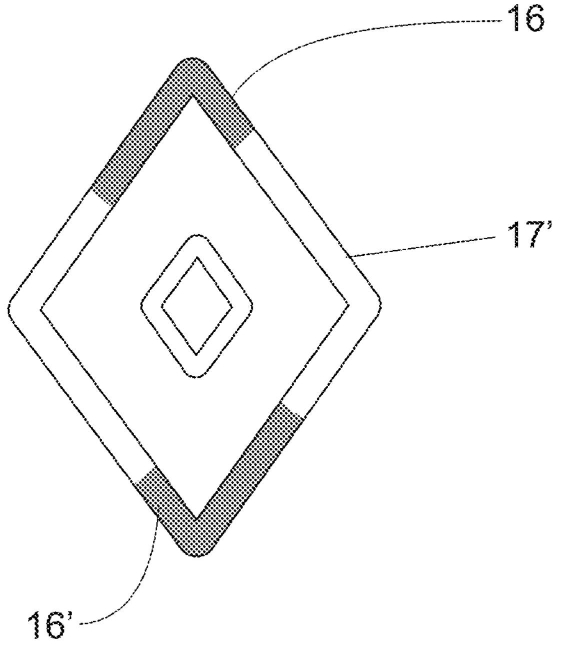
FIG. 7 is a plan view of an embossed pattern of the present disclosure.

Referring to FIG. 6, the linear segments and/or open shapes surrounding the logo 18 may be viewed or appear as interrupted portions of one or more closed shapes 17 of the embossed pattern 12. For instance, linear segments 14 surrounding the logo 18 may have a linear length shorter than the linear segments 14 making up related closed shapes 17 of the embossed pattern 12; the linear segments 14 surrounding the logo 18 may be the same scale as other linear segments 14 making up closed shapes 17 of the embossed pattern 12 (see, for example CD distances S and T may be the same as in FIG. 6); and the angles of the of the linear segments, such as Angles Q and R, of the closed shapes 17 and 17' may be the same as the angles of the linear segments, such as Angles O and P, that form the open shapes 16 and 16' surrounding (in this case CD "above" and CD "below") the logo 18—one or a combination of these elements may form the appearance of a closed shape 17 interrupted by the logo 18. In some cases, the open shapes 16 and 16' and/or segments 14 surrounding the logo 18 may match a portion of the closed shapes 17 in the embossed pattern 12—for example, in FIG. 7, open shapes 16 and 16' (from FIG. 6) are shown as overlaying (via shading) the top and bottom portions of closed element 17' (from FIG. 6) such that they have a matching overlap—in this way the open shapes and/or segments may be said to have the same scale and spacing as the closed shapes or the open shapes may be said to represent a portion of the closed shape (e.g., 17) that remains from the interruption from the logo (e.g., 18)—that is, the whole closed shape would be represented, but for being interrupted by the logo.

A spatial relationship may be formed between first and second embossed objects, which may be open shapes, and a logo. Further, the same spatial relationship may be formed between third and fourth embossed objects, which may be open shapes, and a second logo, where the first and second embossed objects are identical to the third and fourth embossed objects, respectively, and where the logo and the second logo are identical. This spatial relationship may be repeated many times in a rolled product, such that each sheet comprises the spatial relationship as each other sheet.

Aspect Example Sets of the Disclosure

The following aspects are provided as examples in accordance with the disclosure herein and are not intended to limit the scope of the disclosure:

Aspect Set 1

1. A rolled product, comprising:

an embossed pattern comprising a closed shape;

wherein the embossed pattern further comprises a first open shape disposed adjacent to and above (in a cross-machine direction, CD) a logo and a second open shape disposed adjacent to and below (in the CD) the logo; and wherein no ends of the first or second open shapes are within about 2.5 mm to the logo along a CD axis.

2. The rolled product of claim 1, wherein the first and second open shapes are capable of a matching overlap with a portion the closed shape.

3. The rolled product of claim 1, wherein the first open shape comprises a linear segment and wherein a line of dots and/or dashes is spaced from and runs parallel with the linear segment.

4. The rolled product of claim 1, wherein the at least 3 open shapes are immediately adjacent to the logo.

5. The rolled product of claim 1, wherein the first open shape is formed from first and second linear segments, wherein the first linear segment has a linear length greater than the second linear segment.

6. The rolled product of claim 5, wherein the second open shape is formed from third and fourth linear segments, wherein the third linear segment has a linear length greater than the fourth linear segment.

7. The rolled product of claim 6, wherein the first and third linear segments have the same length and/or the second and fourth linear segments have the same length.

8. The rolled product of claim 6, wherein a first angle is formed between the first and second linear segments and wherein a second angle is formed between the third and fourth linear segments, and wherein the first and second angles are within 5 degrees of each other.

9. The rolled product of claim 8, wherein the closed shape comprises a third angle, and wherein the third angle is the same as the first and second angles.

10. The rolled product of claim 6, wherein a first angle is formed between the first and second linear segments and wherein the closed shape comprises a third angle, and wherein the third angle is the same as the first angle.

11. The rolled product of claim 6, wherein a second angle is formed between the third and fourth linear segments and wherein the closed shape comprises a third angle, and wherein the third angle is the same as the second angle.

12. The rolled product of claim 1, wherein a spatial relationship is formed between the first and second open shapes and the logo, and wherein the spatial relationship is formed between third and fourth open shapes and a second logo, wherein the first and second open shapes are identical to the third and fourth open shapes, respectively, and wherein the logo and the second logo are identical.

Aspect Set 2

What is claimed is:

1. A rolled product, comprising:

an embossed pattern comprising a closed shape;

wherein the embossed pattern further comprises a first shape disposed adjacent to and above (in a cross-machine direction, CD) a logo and a second shape disposed adjacent to and below (in the CD) the logo; and wherein no ends or edges of the first or second shapes are within about 2.5 mm to the logo along a CD axis.

2. The rolled product of claim 1, wherein the first shape is formed by a plurality of solid shapes.

3. The rolled product of claim 1, wherein the second shape is formed by a plurality of solid shapes.

Aspect Set 3

What is claimed is:

1. A rolled product, comprising:

an embossed pattern on a fibrous web, wherein the fibrous web comprises a machine direction axis (MDA);

wherein the embossed pattern comprises first and second embossed objects;

wherein the first embossed object has a first end or a first edge that terminates at the MDA;

wherein the second embossed object does not have an end or an edge that terminates at the MDA; and wherein the first and second embossed objects are spaced from each other in a cross-machine direction.

Test Methods

If the method does not define a number of replicates to test, the "average" of each of the below described parameters for a roll is achieved by testing each roll within a most-outer package on a retail shelf and taking the average value.

Unless otherwise indicated, all tests described herein including those described under the Definitions section and the following test methods are conducted on samples, fibrous structure samples and/or sanitary tissue product samples and/or handsheets that have been conditioned in a conditioned room at a temperature of 73° F.±4° F. (about 23° C.±2.2° C.) and a relative humidity of 50%±10% for 2 hours prior to the test. Further, all tests are conducted in such conditioned room. Tested samples and felts should be subjected to 73° F.±4° F. (about 23° C.±2.2° C.) and a relative humidity of 50%±10% for 2 hours prior to testing.

"Basis Weight" Method:

Basis Weight is measured by preparing one or more samples of a certain area ($m^2$) and weighing the sample(s) of a fibrous structure according to the present disclosure and/or a sanitary toilet tissue product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples ($m^2$). The basis weight ($g/m^2$) is calculated by dividing the average weight (g) by the average area of the samples ($m^2$).

"Total Dry Tensile Strength" Test Method:

One (1) inch by five (5) inch (2.5 cm×12.7 cm) strips of fibrous structure and/or sanitary toilet tissue product are provided. The strip is placed on an electronic tensile tester Model 1122 commercially available from Instron Corp., Canton, Mass. in a conditioned room at a temperature of 73° F.±4° F. (about 28° C.±2.2° C.) and a relative humidity of 50%±10%. The crosshead speed of the tensile tester is 2.0 inches per minute (about 5.1 cm/minute) and the gauge length is 4.0 inches (about 10.2 cm). The Dry Tensile Strength can be measured in any direction by this method. The "Total Dry Tensile Strength" or "TDT" is the special case determined by the arithmetic total of MD and CD tensile strengths of the strips.

"Total Wet Tensile Strength" Test Method:

An electronic tensile tester (Thwing-Albert EJA Materials Tester, Thwing-Albert Instrument Co., 10960 Dutton Rd., Philadelphia, Pa., 19154) is used and operated at a crosshead speed of 4.0 inch (about 10.16 cm) per minute and a gauge length of 1.0 inch (about 2.54 cm), using a strip of a fibrous structure and/or sanitary tissue product of 1 inch wide and a length greater than 3 inches long. The two ends of the strip are placed in the upper jaws of the machine, and the center of the strip is placed around a stainless steel peg (0.5 cm in diameter). After verifying that the strip is bent evenly around the steel peg, the strip is soaked in distilled water at about 20° C. for a soak time of 5 seconds before initiating cross-head movement. The initial result of the test is an array of data in the form load (grams force) versus crosshead displacement (centimeters from starting point).

The sample is tested in two orientations, referred to here as MD (machine direction, i.e., in the same direction as the continuously wound reel and forming fabric) and CD (cross-machine direction, i.e., 90° from MD). The MD and CD wet tensile strengths are determined using the above equipment and the "Total Wet Tensile Strength" or "TWT" is determined by taking the sum of these two values.

"Softness" Test Method:

Ideally, prior to softness testing, the samples to be tested should be conditioned according to Tappi Method #T4020M-88. Here, samples are preconditioned for 24 hours at a relative humidity level of 10 to 35% and within a temperature range of 22° C. to 40° C. After this preconditioning step, samples should be conditioned for 24 hours at a relative humidity of 48% to 52% and within a temperature range of 22° C. to 24° C. Ideally, the softness panel testing should take place within the confines of a constant temperature and humidity room. If this is not feasible, all samples, including the controls, should experience identical environmental exposure conditions.

Softness testing is performed as a paired comparison in a form similar to that described in "Manual on Sensory Testing Methods", ASTM Special Technical Publication 434, published by the American Society For Testing and Materials 1968 and is incorporated herein by reference. Softness is evaluated by subjective testing using what is referred to as a Paired Difference Test. The method employs a standard external to the test material itself. For tactile perceived softness two samples are presented such that the subject cannot see the samples, and the subject is required to choose one of them on the basis of tactile softness. The result of the test is reported in what is referred to as Panel Score Unit (PSU). With respect to softness testing to obtain the softness data reported herein in PSU, a number of softness panel tests are performed. In each test ten practiced softness judges are asked to rate the relative softness of three sets of paired samples. The pairs of samples are judged one pair at a time by each judge: one sample of each pair being designated X and the other Y. Briefly, each X sample is graded against its paired Y sample as follows:

1. a grade of plus one is given if X is judged to may be a little softer than Y, and a grade of minus one is given if Y is judged to may be a little softer than X;

2. a grade of plus two is given if X is judged to surely be a little softer than Y, and a grade of minus two is given if Y is judged to surely be a little softer than X;

3. a grade of plus three is given to X if it is judged to be a lot softer than Y, and a grade of minus three is given if Y is judged to be a lot softer than X; and, lastly:

4. a grade of plus four is given to X if it is judged to be a whole lot softer than Y, and a grade of minus 4 is given if Y is judged to be a whole lot softer than X.

The grades are averaged and the resultant value is in units of PSU. The resulting data are considered the results of one panel test. If more than one sample pair is evaluated then all sample pairs are rank ordered according to their grades by paired statistical analysis. Then, the rank is shifted up or down in value as required to give a zero PSU value to which ever sample is chosen to be the zero-base standard. The other samples then have plus or minus values as determined by their relative grades with respect to the zero base standard. The number of panel tests performed and averaged is such that about 0.2 PSU represents a significant difference in subjectively perceived softness.

"Lint" Value Test Method:

The amount of lint generated from a finished fibrous structure is determined with a Sutherland Rub Tester. This tester uses a motor to rub a weighted felt 5 times over the finished fibrous structure, while the finished fibrous structure is restrained in a stationary position. This finished fibrous structure can be is referred to throughout this method as the "web". The Hunter Color L value is measured before and after the rub test. The difference between these two Hunter Color L values is then used to calculate a lint value. This lint method is designed to be used with white or substantially white fibrous structures and/or sanitary toilet tissue products. Therefore, if testing of a non-white tissue, such as blue-colored or peach-colored tissue is desired, the same formulation should be used to make a sample without the colored dye, pigment, etc, using bleached kraft pulps.

i. Sample Preparation

Prior to the lint rub testing, the samples to be tested should be conditioned according to Tappi Method #T402OM-88. Here, samples are preconditioned for 24 hours at a relative humidity level of 10 to 35% and within a temperature range of 22° C. to 40° C. After this preconditioning step, samples should be conditioned for 24 hours at a relative humidity of 48 to 52% and within a temperature range of 22° C. to 24° C. This rub testing should also take place within the confines of the constant temperature and humidity room.

The Sutherland Rub Tester may be obtained from Testing Machines, Inc. (Amityville, N.Y., 1701). The web is first prepared by removing and discarding any product which might have been abraded in handling, e.g. on the outside of the roll. For products formed from multiple plies of webs, this test can be used to make a lint measurement on the multi-ply product, or, if the plies can be separated without damaging the specimen, a measurement can be taken on the individual plies making up the product. If a given sample differs from surface to surface, it is necessary to test both surfaces and average the values in order to arrive at a composite lint value. In some cases, products are made from multiple-plies of webs such that the facing-out surfaces are identical, in which case it is only necessary to test one surface. If both surfaces are to be tested, it is necessary to obtain six specimens for testing (Single surface testing only requires three specimens). Each specimen should be folded in half such that the crease is running along the cross direction (CD) of the web sample. For two-surface testing, make up 3 samples with a first surface "out" and 3 with the second-side surface "out". Keep track of which samples are first surface "out" and which are second surface out.

Obtain a 30"×40" piece of Crescent #300 cardboard from Cordage Inc. (800 E. Ross Road, Cincinnati, Ohio, 45217). Using a paper cutter, cut out six pieces of cardboard of dimensions of 2.5" 6". Puncture two holes into each of the six cards by forcing the cardboard onto the hold down pins of the Sutherland Rub tester.

Center and carefully place each of the 2.5×6" cardboard pieces on top of the six previously folded samples. Make sure the 6" dimension of the cardboard is running parallel to the machine direction (MD) of each of the tissue samples. Center and carefully place each of the cardboard pieces on top of the three previously folded samples. Once again, make sure the 6" dimension of the cardboard is running parallel to the machine direction (MD) of each of the web samples.

Fold one edge of the exposed portion of the web specimen onto the back of the cardboard. Secure this edge to the cardboard with adhesive tape obtained from 3M Inc. (¾" wide Scotch Brand, St. Paul, Minn.). Carefully grasp the other over-hanging tissue edge and snugly fold it over onto the back of the cardboard. While maintaining a snug fit of the web specimen onto the board, tape this second edge to the back of the cardboard. Repeat this procedure for each sample.

Turn over each sample and tape the cross direction edge of the web specimen to the cardboard. One half of the adhesive tape should contact the web specimen while the other half is adhering to the cardboard. Repeat this procedure for each of the samples. If the tissue sample breaks, tears, or becomes frayed at any time during the course of this sample preparation procedure, discard and make up a new sample with a new tissue sample strip.

There will now be 3 first-side surface "out" samples on cardboard and (optionally) 3 second-side surface "out" samples on cardboard.

ii. Felt Preparation

Obtain a 30"×40" piece of Crescent #300 cardboard from Cordage Inc. (800 E. Ross Road, Cincinnati, Ohio, 45217). Using a paper cutter, cut out six pieces of cardboard of dimensions of 2.25"×7.25". Draw two lines parallel to the short dimension and down 1.125" from the top and bottom most edges on the white side of the cardboard. Carefully score the length of the line with a razor blade using a straight edge as a guide. Score it to a depth about half way through the thickness of the sheet. This scoring allows the cardboard/felt combination to fit tightly around the weight of the Sutherland Rub tester. Draw an arrow running parallel to the long dimension of the cardboard on this scored side of the cardboard.

Cut the six pieces of black felt (F-55 or equivalent from New England Gasket, 550 Broad Street, Bristol, Conn. 06010) to the dimensions of 2.25"×8.5"×0.0625". Place the felt on top of the unscored, green side of the cardboard such that the long edges of both the felt and cardboard are parallel and in alignment. Make sure the fluffy side of the felt is facing up. Also allow about 0.5" to overhang the top and bottom most edges of the cardboard. Snugly fold over both overhanging felt edges onto the backside of the cardboard with Scotch brand tape. Prepare a total of six of these felt/cardboard combinations.

For best reproducibility, all samples should be run with the same lot of felt. Obviously, there are occasions where a single lot of felt becomes completely depleted. In those cases where a new lot of felt must be obtained, a correction factor should be determined for the new lot of felt. To determine the correction factor, obtain a representative single web sample of interest, and enough felt to make up 24 cardboard/felt samples for the new and old lots.

As described below and before any rubbing has taken place, obtain Hunter L readings for each of the 24 cardboard/felt samples of the new and old lots of felt. Calculate the averages for both the 24 cardboard/felt samples of the old lot and the 24 cardboard/felt samples of the new lot. Next, rub test the 24 cardboard/felt boards of the new lot and the 24 cardboard/felt boards of the old lot as described below. Make sure the same web lot number is used for each of the 24 samples for the old and new lots. In addition, sampling of the web in the preparation of the cardboard/tissue samples must be done so the new lot of felt and the old lot of felt are exposed to as representative as possible of a tissue sample. Discard any product which might have been damaged or abraded. Next, obtain 48 web samples for the calibration. Place the first sample on the far left of the lab bench and the last of the 48 samples on the far right of the bench. Mark the sample to the far left with the number "1" in a 1 cm by 1 cm area of the corner of the sample. Continue to mark the samples consecutively up to 48 such that the last sample to the far right is numbered 48.

Use the 24 odd numbered samples for the new felt and the 24 even numbered samples for the old felt. Order the odd number samples from lowest to highest. Order the even numbered samples from lowest to highest. Now, mark the lowest number for each set with a letter "F" (for "first-side"). Mark the next highest number with the letter "S" (for second-side). Continue marking the samples in this alternating "F"/"S" pattern. Use the "F" samples for first surface "out" lint analyses and the "S" samples for second-side surface "out" lint analyses. There are now a total of 24 samples for the new lot of felt and the old lot of felt. Of this 24, twelve are for first-side surface "out" lint analysis and 12 are for second-side surface "out" lint analysis.

Rub and measure the Hunter Color L values for all 24 samples of the old felt as described below. Record the 12 first-side surface Hunter Color L values for the old felt. Average the 12 values. Record the 12 second-side surface Hunter Color L values for the old felt. Average the 12 values. Subtract the average initial un-rubbed Hunter Color L felt reading from the average Hunter Color L reading for the first-side surface rubbed samples. This is the delta average difference for the first-side surface samples. Subtract the average initial un-rubbed Hunter Color L felt reading from the average Hunter Color L reading for the second-side surface rubbed samples. This is the delta average difference for the second-side surface samples. Calculate the sum of the delta average difference for the first-side surface and the delta average difference for the second-side surface and divide this sum by 2. This is the uncorrected lint value for the old felt. If there is a current felt correction factor for the old felt, add it to the uncorrected lint value for the old felt. This value is the corrected Lint Value for the old felt.

Rub and measure the Hunter Color L values for all 24 samples of the new felt as described below. Record the 12 first-side surface Hunter Color L values for the new felt. Average the 12 values. Record the 12 second-side surface Hunter Color L values for the new felt. Average the 12 values. Subtract the average initial un-rubbed Hunter Color L felt reading from the average Hunter Color L reading for the first-side surface rubbed samples. This is the delta average difference for the first-side surface samples. Subtract the average initial un-rubbed Hunter Color L felt reading from the average Hunter Color L reading for the second-side surface rubbed samples. This is the delta average difference for the second-side surface samples. Calculate the sum of the delta average difference for the first side surface and the delta average difference for the second-side surface and divide this sum by 2. This is the uncorrected lint value for the new felt.

Take the difference between the corrected Lint Value from the old felt and the uncorrected lint value for the new felt. This difference is the felt correction factor for the new lot of felt. Adding this felt correction factor to the uncorrected lint value for the new felt should be identical to the corrected Lint Value for the old felt. Note that the above procedure implies that the calibration is done with a two-surfaced specimen. If it desirable or necessary to do a felt calibration using a single-surfaced sample, it is satisfactory; however, the total of 24 tests should still be done for each felt.

iii. Care of 4 Pound Weight

The four pound weight has four square inches of effective contact area providing a contact pressure of one pound per square inch. Since the contact pressure can be changed by alteration of the rubber pads mounted on the face of the weight, it is important to use only the rubber pads supplied by the manufacturer (Brown Inc., Mechanical Services Department, Kalamazoo, Mich.). These pads must be replaced if they become hard, abraded or chipped off. When not in use, the weight must be positioned such that the pads are not supporting the full weight of the weight. It is best to store the weight on its side.

iv. Rub Tester Instrument Calibration

The Sutherland Rub Tester must first be calibrated prior to use. First, turn on the Sutherland Rub Tester by moving the tester switch to the “cont” position. When the tester arm is in its position closest to the user, turn the tester’s switch to the “auto” position. Set the tester to run 5 strokes by moving the pointer arm on the large dial to the “five” position setting. One stroke is a single and complete forward and reverse motion of the weight. The end of the rubbing block should be in the position closest to the operator at the beginning and at the end of each test. Prepare a test specimen on cardboard sample as described above. In addition, prepare a felt on cardboard sample as described above. Both of these samples will be used for calibration of the instrument and will not be used in the acquisition of data for the actual samples.

Place this calibration web sample on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight. Hook this weight onto the tester arm and gently place the tissue sample underneath the weight/felt combination. The end of the weight closest to the operator must be over the cardboard of the web sample and not the web sample itself. The felt must rest flat on the tissue sample and must be in 100% contact with the web surface. Activate the tester by depressing the “push” button.

Keep a count of the number of strokes and observe and make a mental note of the starting and stopping position of the felt covered weight in relationship to the sample. If the total number of strokes is five and if the end of the felt covered weight closest to the operator is over the cardboard of the web sample at the beginning and end of this test, the tester is calibrated and ready to use. If the total number of strokes is not five or if the end of the felt covered weight closest to the operator is over the actual web sample either at the beginning or end of the test, repeat this calibration procedure until 5 strokes are counted the end of the felt covered weight closest to the operator is situated over the cardboard at the both the start and end of the test. During the actual testing of samples, monitor and observe the stroke count and the starting and stopping point of the felt covered weight. Recalibrate when necessary.

v. Hunter Color Meter Calibration

Adjust the Hunter Color Difference Meter for the black and white standard plates according to the procedures outlined in the operation manual of the instrument. Also run the stability check for standardization as well as the daily color stability check if this has not been done during the past eight hours. In addition, the zero reflectance must be checked and readjusted if necessary. Place the white standard plate on the sample stage under the instrument port. Release the sample stage and allow the sample plate to be raised beneath the sample port. Using the “L-Y”, “a-X”, and “b-Z” standardizing knobs, adjust the instrument to read the Standard White Plate Values of “L”, “a”, and “b” when the “L”, “a”, and “b” push buttons are depressed in turn.

vi. Measurement of Samples

The first step in the measurement of lint is to measure the Hunter color values of the black felt/cardboard samples prior to being rubbed on the web sample. The first step in this measurement is to lower the standard white plate from under the instrument port of the Hunter color instrument. Center a felt covered cardboard, with the arrow pointing to the back of the color meter, on top of the standard plate. Release the sample stage, allowing the felt covered cardboard to be raised under the sample port.

Since the felt width is only slightly larger than the viewing area diameter, make sure the felt completely covers the viewing area. After confirming complete coverage, depress the L push button and wait for the reading to stabilize. Read and record this L value to the nearest 0.1 unit. If a D25D2A head is in use, lower the felt covered cardboard and plate, rotate the felt covered cardboard 90° so the arrow points to the right side of the meter. Next, release the sample stage and check once more to make sure the viewing area is completely covered with felt. Depress the L push button. Read and record this value to the nearest 0.1 unit. For the D25D2M unit, the recorded value is the Hunter Color L value. For the D25D2A head where a rotated sample reading is also recorded, the Hunter Color L value is the average of the two recorded values.

Measure the Hunter Color L values for all of the felt covered cardboards using this technique. If the Hunter Color L values are all within 0.3 units of one another, take the average to obtain the initial L reading. If the Hunter Color L values are not within the 0.3 units, discard those felt/cardboard combinations outside the limit. Prepare new samples and repeat the Hunter Color L measurement until all samples are within 0.3 units of one another.

For the measurement of the actual web sample/cardboard combinations, place the web sample/cardboard combination on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight Hook this weight onto the tester arm and gently place the web sample underneath the weight/felt combination. The end of the weight closest to the operator must be over the cardboard of the web sample and not the web sample itself. The felt must rest flat on the web sample and must be in 100% contact with the web surface.

Next, activate the tester by depressing the "push" button. At the end of the five strokes the tester will automatically stop. Note the stopping position of the felt covered weight in relation to the sample. If the end of the felt covered weight toward the operator is over cardboard, the tester is operating properly. If the end of the felt covered weight toward the operator is over sample, disregard this measurement and recalibrate as directed above in the Sutherland Rub Tester Calibration section.

Remove the weight with the felt covered cardboard. Inspect the web sample. If torn, discard the felt and web sample and start over. If the web sample is intact, remove the felt covered cardboard from the weight. Determine the Hunter Color L value on the felt covered cardboard as described above for the blank felts. Record the Hunter Color L readings for the felt after rubbing. Rub, measure, and record the Hunter Color L values for all remaining samples. After all web specimens have been measured, remove and discard all felt. Felts strips are not used again. Cardboards are used until they are bent, torn, limp, or no longer have a smooth surface.

vii. Calculations

Determine the delta L values by subtracting the average initial L reading found for the unused felts from each of the measured values for the first-side surface and second-side surface sides of the sample as follows.

For samples measured on both surfaces, subtract the average initial L reading found for the unused felts from each of the three first-side surface L readings and each of the three second-side surface L readings. Calculate the average delta for the three first-side surface values. Calculate the average delta for the three second-side surface values. Subtract the felt factor from each of these averages. The final results are termed a lint for the first-side surface and a lint for the second-side surface of the web.

By taking the average of the lint value on the first-side surface and the second-side surface, the lint is obtained which is applicable to that particular web or product. In other words, to calculate lint value, Formula 4 below is used:

$$\text{Lint Value} = \frac{\text{Lint Value, first-side} + \text{Lint Value, second-side}}{2}$$

Formula 4

For samples measured only for one surface, subtract the average initial L reading found for the unused felts from each of the three L readings. Calculate the average delta for the three surface values. Subtract the felt factor from this average. The final result is the "Lint" value for that particular web or product.

Color Test Method:

Color-containing surfaces are tested in a dry state and at an ambient humidity of approximately 500%.+-0.2%. Reflectance color is measured using the Hunter Lab LabScan XE reflectance spectrophotometer obtained from Hunter Associates Laboratory of Reston, Va. The spectrophotometer is set to the CIELab color scale and with a D50 illumination. The Observer is set at 10° and the Mode is set at 45/0°. Area View is set to 0.125" and Port Size is set to 0.20" for films; Area View is set to 1.00" and Port Size is set to 1.20" other materials. The spectrophotometer is calibrated prior to sample analysis utilizing the black and white reference tiles supplied from the vendor with the instrument. Calibration is done according to the manufacturer's instructions as set forth in LabScan XE User's Manual, Manual Version 1.1, August 2001, A60-1010-862.

If cleaning is required of the reference tiles or samples, only tissues that do not contain embossing, lotion, or brighteners should be used (e.g., Puffs® tissue). Any sample point on the externally visible surface of the element containing the imparted color to be analyzed should be selected. Sample points are selected so as to be close in perceived color. A single ply of the element is placed over the spectrophotometer's sample port. A single ply, as used within the test method, means that the externally visible surface of the element is not folded. Thus, a single ply of an externally visible surface may include the sampling of a laminate, which itself is comprised of more than one lamina. The sample point comprising the color to be analyzed must be larger than the sample port to ensure accurate measurements. A white tile, as supplied by the manufacturer, is placed behind the externally visible surface. The L*, a*, and b* values are read and recorded. The externally visible surface is removed and repositioned so that a minimum of six readings are obtained for the externally visible surface. If possible (e.g., the size of the imparted color on the element in question does not limit the ability to have six discretely different, non-overlapping sample points), each of the readings is to be performed at a substantially different region on the externally visible surface so that no two sample points overlap. If the size of the imparted color region requires overlapping of sample points, only six samples should be taken with the sample points selected to minimize overlap between any two sample points. The readings are averaged to yield the reported L*, a*, and b* values for a specified color on an externally visible surface of an element.

In calculating the color space volume, V, maximum and minimum L*, a*, and b* values are determined for a particular set of elements to be color matched. The maximum and minimum L*, a*, and b* values are used to calculate V according to Formula 2 presented above.

Absorbency Test Method (Horizontal Full Sheet (HFS)):

The Horizontal Full Sheet (HFS) test method determines the amount of distilled water absorbed and retained by a sanitary toilet tissue product of the present disclosure. This method is performed by first weighing a sample of the sanitary toilet tissue product to be tested (referred to herein as the "Dry Weight of the paper"), then thoroughly wetting the sanitary toilet tissue product, draining the wetted sanitary toilet tissue product in a horizontal position and then reweighing (referred to herein as "Wet Weight of the paper"). The absorptive capacity of the sanitary toilet tissue product is then computed as the amount of water retained in units of grams of water absorbed by the sanitary toilet tissue product. When evaluating different sanitary toilet tissue product samples, the same size of sanitary toilet tissue product is used for all samples tested.

The apparatus for determining the HFS capacity of sanitary toilet tissue product comprises the following: an electronic balance with a sensitivity of at least ±0.01 grams and a minimum capacity of 1200 grams. The balance should be positioned on a balance table and slab to minimize the vibration effects of floor/benchtop weighing. The balance should also have a special balance pan to be able to handle the size of the sanitary toilet tissue product tested (i.e.; a paper sample of about 11 in. (27.9 cm) by 11 in. (27.9 cm)). The balance pan can be made out of a variety of materials. Plexiglass is a common material used.

A sample support rack and sample support cover is also required. Both the rack and cover are comprised of a lightweight metal frame, strung with 0.012 in. (0.305 cm) diameter monofilament so as to form a grid of 0.5 inch squares (1.27 $cm^2$). The size of the support rack and cover is such that the sample size can be conveniently placed between the two.

The HFS test is performed in an environment maintained at 23±1° C. and 50±2% relative humidity. A water reservoir or tub is filled with distilled water at 23±1° C. to a depth of 3 inches (7.6 cm).

The sanitary toilet tissue product to be tested is carefully weighed on the balance to the nearest 0.01 grams. The dry weight of the sample is reported to the nearest 0.01 grams. The empty sample support rack is placed on the balance with the special balance pan described above. The balance is then zeroed (tared). The sample is carefully placed on the sample support rack. The support rack cover is placed on top of the support rack. The sample (now sandwiched between the rack and cover) is submerged in the water reservoir. After the sample has been submerged for 60 seconds, the sample support rack and cover are gently raised out of the reservoir.

The sample, support rack and cover are allowed to drain horizontally for 120±5 seconds, taking care not to excessively shake or vibrate the sample. Next, the rack cover is carefully removed and the wet sample and the support rack are weighed on the previously tared balance. The weight is recorded to the nearest 0.01 g. This is the wet weight of the sample.

The gram per sanitary toilet tissue product sample absorptive capacity of the sample is defined as (Wet Weight of the paper—Dry Weight of the paper).

"Roll Density" Test Method

For this test, the rolled paper product roll is the test sample. Remove all of the test rolled paper product rolls from any packaging and allow them to condition at about 23° C.±2 C.° and about 50%±2% relative humidity for 24 hours prior to testing. Rolls with cores that are crushed, bent or damaged should not be tested.

The Roll Density is calculated by dividing the mass of the roll by its volume using the following equation:

$$\text{Roll Density}\left(\frac{g}{\text{cm}^3}\right) = \frac{\text{Mass}\,(g)}{\text{Roll Width (cm)}\cdot\pi\,[\text{Outer Radius (cm)}^2 - \text{Inner Radius (cm)}^2]}$$

FIG. 11 visually describes the measurement of a rolled paper product roll where Z is the center axis of the roll, where the outer radius $r_2$ in units of cm is measured using the Roll Diameter Test Method described herein, the inner radius $r_1$ in units of cm is measured using a caliper tool inside the core, the roll width W is measured using a ruler or tape measure in units of cm and the mass in units of g is the weight of the entire roll including core.

In like fashion analyze a total of ten (10) replicate sample rolls. Calculate the arithmetic mean of the 10 values and report the Roll Density to the nearest 0.001 g/$cm^3$.

"Roll Diameter" Test Method

For this test, the actual rolled paper product roll is the test sample. Remove all of the test rolled paper product rolls from any packaging and allow them to condition at about 23° C.±2 C.° and about 50%±2% relative humidity for 24 hours prior to testing. Rolls with cores that are crushed, bent or damaged should not be tested.

The diameter of the test rolled paper product roll is measured directly using a Pi® tape of appropriate length or equivalent precision diameter tape (e.g. an Executive Diameter tape available from Apex Tool Group, LLC, Apex, N.C., Model No. W606PD) which converts the circumferential distance into a diameter measurement, so the roll diameter is directly read from the scale. The diameter tape is graduated to 0.01 inch increments. The tape is 0.25 inches wide and is made of flexible metal that conforms to the curvature of the test sanitary tissue product roll but is not elongated under the loading used for this test.

Loosely loop the diameter tape around the circumference of the test rolled paper product roll, placing the tape edges directly adjacent to each other with the surface of the tape lying flat against the test rolled paper product roll. Pull the tape snug against the circumference of the test rolled paper product roll, applying approximately 100 g of force. Wait 3 seconds. At the intersection of the diameter tape, read the diameter aligned with the zero mark of the diameter tape and record as the Roll Diameter to the nearest 0.01 inches. The outer radius of the rolled paper product roll is also calculated from this test method.

In like fashion analyze a total of ten (10) replicate sample rolled paper product rolls. Calculate the arithmetic mean of the 10 values and report the Roll Diameter to the nearest 0.01 inches.

"Roll Firmness" Test Method for Toilet Tissue Roll and Paper Towel Roll Samples

Roll Firmness is measured on a constant rate of extension tensile tester with computer interface (a suitable instrument is the MTS Alliance using Testworks 4.0 Software, as available from MTS Systems Corp., Eden Prairie, Minn.) using a load cell for which the forces measured are within 10% to 90% of the limit of the cell. The roll product is held horizontally, a cylindrical probe is pressed into the test roll, and the compressive force is measured versus the depth of penetration. All testing is performed in a conditioned room maintained at 23° C.±2 C.° and 50%±2% relative humidity.

Referring to FIG. 12, the upper movable fixture 2000 consist of a cylindrical probe 2001 made of machined aluminum with a 19.00±0.05 mm diameter and a length of 38 mm. The end of the cylindrical probe 2002 is hemispheric (radius of 9.50±0.05 mm) with the opposing end 2003 machined to fit the crosshead of the tensile tester. The fixture includes a locking collar 2004 to stabilize the probe and maintain alignment orthogonal to the lower fixture. The lower stationary fixture 2100 is an aluminum fork with vertical prongs 2101 that supports a smooth aluminum sample shaft 2101 in a horizontal position perpendicular to the probe. The lower fixture has a vertical post 2102 machined to fit its base of the tensile tester and also uses a locking collar 2103 to stabilize the fixture orthogonal to the upper fixture.

The sample shaft 2101 has a diameter that is 85% to 95% of the inner diameter of the roll and longer than the width of the roll. The ends of sample shaft are secured on the vertical prongs with a screw cap 2104 to prevent rotation of the shaft during testing. The height of the vertical prongs 2101 should be sufficient to assure that the test roll does not contact the horizontal base of the fork during testing. The horizontal distance between the prongs must exceed the length of the test roll.

Program the tensile tester to perform a compression test, collecting force and crosshead extension data at an acquisition rate of 100 Hz. Lower the crosshead at a rate of 10 mm/min until 5.00 g is detected at the load cell. Set the current crosshead position as the corrected gage length and zero the crosshead position. Begin data collection and lower the crosshead at a rate of 50 mm/min until the force reaches 10 N. Return the crosshead to the original gage length.

Remove all of the test rolls from their packaging and allow them to condition at about 23° C.±2 C.° and about 50%±2% relative humidity for 2 hours prior to testing. Rolls with cores that are crushed, bent or damaged should not be tested. Insert sample shaft through the test roll's core and then mount the roll and shaft onto the lower stationary fixture. Secure the sample shaft to the vertical prongs then align the midpoint of the roll's width with the probe. Orient the test roll's tail seal so that it faces upward toward the probe. Rotate the roll 90 degrees toward the operator to align it for the initial compression.

Position the tip of the probe approximately 2 cm above the surface of the sample roll. Zero the crosshead position and load cell and start the tensile program. After the crosshead has returned to its starting position, rotate the roll toward the operator 120 degrees and in like fashion acquire a second measurement on the same sample roll.

From the resulting Force (N) verses Distance (mm) curves, read the penetration at 7.00 N as the Roll Firmness and record to the nearest 0.1 mm. In like fashion analyze a total of ten (10) replicate sample rolls. Calculate the arithmetic mean of the 20 values and report Roll Firmness to the nearest 0.1 mm.

ADDITIONAL CONSIDERATIONS

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A rolled product, comprising:

an embossed pattern on a fibrous web, the embossed pattern comprising first and second embossed objects and a logo;

wherein the first embossed object has a first end or a first edge that is within a first CD distance of about 20 mm of the logo, wherein the first embossed object is open;

wherein the second embossed object has a second end or a second edge that is within a second CD distance of about 20 mm of the logo, wherein the second embossed object is open;

wherein the second CD distance is not equal to the first CD distance; and wherein the second end or second edge of the second embossed object is at an angle of greater than about 10 degrees relative to the first end or first edge of the first embossed object.

2. The rolled product of claim 1, wherein the first CD distance is from about 2.5 mm to about 20 mm.

3. The rolled product of claim 1, wherein the second CD distance is from about 2.5 mm to about 20 mm.

4. The rolled product of claim 1, wherein the angle is from about 10 to about 50.

5. The rolled product of claim 1, wherein the first embossed object comprises a linear segment.

6. The rolled product of claim 1, wherein the first embossed object comprises two linear segments.

7. The rolled product of claim 1, wherein the first end is at an end of a linear segment.

8. The rolled product of claim 1, wherein the second embossed object comprises dots or dashes.

9. The rolled product of claim 1, wherein the second embossed object comprises a line of dots.

10. The rolled product of claim 1, wherein the second edge is at an edge of an end dot in a line of dots.

11. The rolled product of claim 9, wherein the line of dots is spaced from and runs parallel with a linear segment.

12. The rolled product of claim 1, wherein the logo is a collection of embossed letters.

13. The rolled product of claim 1, further comprising perforations that separate the fibrous web into a plurality of connected sheets.

14. The rolled product of claim 13, wherein at least one of the perforations overlaps the first embossed object.

15. The rolled product of claim 13, wherein at least one of the perforations overlaps the second embossed object.

16. The rolled product of claim 1, wherein the second embossed object is a line of dots running parallel to the first embossed object that is a linear segment, wherein the line of dots are outboard of the linear segment such that the linear segment is between the line of dots and the logo.

17. The rolled product of claim 1, wherein the embossed pattern comprises a plurality of closed forms.

18. The rolled product of claim 17, wherein the plurality of closed forms are selected from a group consisting of diamonds, rectangles, squares, circles, pentagons, hexagons, octagons, and combinations thereof.

19. The rolled product of claim 1, wherein the rolled product is selected from paper towels and toilet paper.

20. The rolled product of claim 1, wherein the rolled product comprises a plurality of sheets separated by perforations, and wherein more than 50% of the plurality of sheets comprise logos identical to the logo.

21. The rolled product of claim 1, wherein the fibrous web further comprises a molded pattern.

22. The rolled product of claim 21, wherein the molded pattern comprises linear segments, dots, and/or dashes that are smaller (in scale) than linear segments, dots, and/or dashes of the embossed pattern.

23. The rolled product of claim 21, wherein the molded pattern comprises linear segments that are smaller (in scale) than linear segments of the embossed pattern.

24. The rolled product of claim 1, wherein a spatial relationship is formed between the first and second embossed objects and the logo, and wherein the spatial relationship is formed between third and fourth embossed objects and a second logo, wherein the first and second embossed objects are identical to the third and fourth embossed objects, respectively, and wherein the logo and the second logo are identical.

25. The rolled product of claim 1, wherein the first end or the first edge is within a first CD distance of about 3 mm of the logo.

26. The rolled product of claim 1, wherein the second end or the second edge of the second embossed object is within a second CD distance of about 7 mm of the logo.

27. The rolled product of claim 1, wherein the second end or second edge of the second embossed object is at an angle of greater than about 10 degrees relative to the first end or first edge of the first embossed object.

28. The rolled product of claim 1, wherein the second CD distance is from about 5 mm to about 20 mm.

29. The rolled product of claim 1, wherein the angle is from about 15 to about 50.

* * * * *